United States Patent Office 3,446,790
Patented May 27, 1969

3,446,790
TRIAZINE AND PYRIDINE FIBER REACTIVE AZO DYESTUFFS
Herbert Francis Andrew, Manchester, England, assignor to Imperial Chemical Industries Limited, London, England, a corporation of Great Britain
No Drawing. Filed Aug. 29, 1966, Ser. No. 575,517
Claims priority, application Great Britain, Sept. 3, 1965, 37,695/65
Int. Cl. C09b 29/36, 62/08
U.S. Cl. 260—153       4 Claims

ABSTRACT OF THE DISCLOSURE

Water-soluble reactive dyestuffs which are represented by the formula:

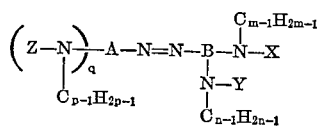

wherein:

A is a disulphonaphthalene, sulphophenylene, sulphonaphthalene, disulphostilbene, phenyleneazo-disulphodiphenylene or phenyleneazo-disulphonaphthalene radical;

B is a m-phenylene or m-tolylene radical;

X, Y and Z are independently, dichloro-s-triazine, monochloro-methoxy - s - triazine, monochlorosulphoanilino-s-triazine, monochloro-sulphotoluidino - s - triazine, monochlorocarboxysulphoanilino - s - triazine, monochloro-disulphoanilino - s - triazine, cyanodichloropyrimidinyl or trichloropyrimidinyl groups; and m, n and p stand for integers of at most 6, q is 1–2; and which contain 2–8 sulphonic acid groups.

---

This invention relates to new water-soluble reactive azo dyestuffs, to the methods of preparation thereof and to the use of such dyestuffs for colouring textile materials.

It is known, for the purpose of colouring fibres containing hydroxyl groups, especially cellulose materials such as cotton and viscose rayon, to use dyestuffs containing groups able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the hydroxyl-reactive group reacts with water instead of the cellulose molecule, a considerable portion of the dyestuff does not fix on the fibre.

Consequently an excess of dyestuff must be used and the dyeings or prints must be thoroughly washed with boiling soap solutions to remove the unreacted dyestuff. The wastage of dyestuff and extra processing make the dyeing or printing process more expensive, especially when deep shades are required.

The present invention is concerned with the production of water-soluble reactive dyestuffs which have a remarkably high fixation on the fibre and for which washing-off treatments can be reduced considerably. It has been found that such properties occur in certain azo dyestuffs having at least benzene or naphthalene nucleus bearing two amino groups each of which, in turn, carries a group capable of entering into reaction with the hydroxyl groups of the cellulose, there being at least 3 such substituted amino groups in the molecule.

The new dyestuffs of the invention are represented by the formula:

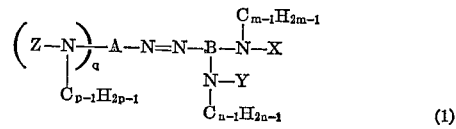

wherein:

A is an aromatic radical,

B is a benzene or naphthalene radical which can bear other substituents,

X, Y and Z stand for groups capable of entering into reaction with the hydroxyl groups of cellulose, m, n and p stand for intergers of at most 6, q is 1 or 2 and which contain at least 2 sulphonic acid groups.

As examples of aromatic radicals represented by A, there can be mentioned, for example, benzene, and naphthalene radicals, also aromatic radicals containing more than one benzene or naphthalene nucleus, for example diphenyl, diphenyloxide, diphenylamine, stilbene, azo-benzene and phenylazonaphthalene radicals, also aromatic radicals containing a heterocyclic nucleus, for example, benzthiazole or naphthatriazole radicals. The aromatic radicals can carry substituents, for example, chlorine and bromine atoms, hydroxyl, amino, methyl, alkoxy, nitro, acylamino, alkyl- and aryl-carbonyl, carboxylic ester, carbamyl, carboxylic acid, alkyl- and aryl-sulphonyl, sulphamyl and sulphonic acid groups, as well as, if desired, additional groups of the kind represented by

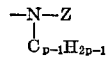

in Formula 1 above.

The benzene or naphthalene nucleus represented by B can also carry substituents of the kind indicated in the preceding paragraph. The depicted nitrogen atoms are preferably attached to the 1, 2 and 4 positions of the benzene or naphthalene nucleus.

As examples of groups which are represented by X, Y or Z, there may be mentioned, for example, the radicals of α:β-unsaturated aliphatic carboxylic acids such as acrylic acid, α-chloroacrylic acid, propiolic acid, maleic acid and mono- and di-chloromaleic acids; more particularly X or Y may represent the radical of an acid which contains a labile halogen atom or a group which readily splits off to form an anion, for example, the radical of a halogenated aliphatic acid such as chloroacetic acid, β-chloro and β-bromo-propionic acids and α,β-dichloropropionic acid or more especially, a heterocyclic radical which contains from 2 to 3 nitrogen atoms in the heterocyclic ring and at least one labile substituent on a carbon atom of the ring. By a labile substitutent there is meant an atom or group which is bound to a carbon atom or ortho position to a nitrogen atom of the heterocyclic ring which atom or group is readily replaced by a hydroxyl group under aqueous alkaline conditions.

As example of such heterocyclic radicals, there may be mentioned, for example 2,3-dichloro-quinoxaline-5- or -6-sulphonyl, 2,3-dichloro-quinoxaline-5- or -6-carbonyl, 2,4-dichloro-quazoline-6- or -7-sulphonyl, 2,4,6,-trichloroquinazoline-7- or 8-sulphonyl, 2,4,7- or 2,4,8-trichloroquinazoline -6-sulphonyl, 2,4 - dichloroquinazoline - 6-carbonyl, 1,4-dichlorophthalazine-6-carbonyl, and, more particularly s-triazine-2-yl and pyrimidin-2-yl or -4-yl radicals which contain on at least one of the remaining 2,4 or 6 positions, a bromine or, preferably, a chlorine atom, a sulphonic acid group, a thiocyano group, and aryloxy or arylthio group containing an electronegative substituent such as sulphophenoxy, sulphophenylthio, nitrosulphophenoxy, disulphophenoxy and sulphonaphthoxy; or a group of the formula:

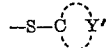 (2)

wherein Y′ represents the group of atoms necessary to form a 5- or 6-membered heterocyclic ring which may carry substituents or form part of a fused ring system; or a quaternary ammonium or pyridinium group; or a group of the formula:

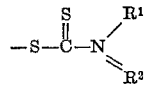 (3)

wherein $R^1$ and $R^2$ each represents the same or different alkyl, cycloalkyl, aryl or aralkyl groups, or $R^1$ and $R^2$ together form, together with the nitrogen atom, a 5- or 6-membered heterocyclic ring; or a group of the formula:

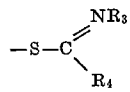 (4)

wherein $R_3$ and $R_4$ may be the same or different and each represents a hydrogen atom or an alkyl, aryl or aralkyl group.

In the cases where the pyrimidine ring or triazine ring carries only one such labile substituent, the said ring may have a non-labile substitutent on the remaining carbon atom or atoms.

By a non-labile substitutent there is meant a group which is bound by a covalent bond to a carbon atom of the triazine or pyrimidine nucleus, which covalent bond is not ruptured under the conditions used for application of the reactive dye. As examples of such substituents, there may be mentioned, for example, primary amino and and hydroxyl groups, also mono- or di-substituted amino groups, etherified hydroxyl and etherified mercapto groups; in the case substituted amino groups, this class includes, for example, mono- and di-alkylamino groups in which the alkyl groups preferably contain at most 4 carbon atoms, and which may also contain such substituents as chloride atoms or hydroxyl, alkoxy or sulphate groups; and phenylamino and naphthylamino groups preferably containing sulphonic acid substituents; in the case of etherified hydroxyl and mercapto groups, this class includes, for example alkoxy and alkylthio groups, preferably those of low molecular weight, i.e. having up to about 4 carbon atoms and phenoxy, phenylthio, naphthoxy or naphthylthio groups; as particular examples of all these classes there may be mentioned, for example, methylamino, ethylamino, dimethylamino, β-hydroxyethylamino, di-(β- hydroxyethyl)amino, β-chloroethylamino, cyclohexylamino, anilino, sulphophenylamino, disulphophenylamino, N-methyl-sulphophenylamino, N-β-hydroxy-ethyl-sulphophenylamino, carboxyphenylamino and sulphocarboxyphenylamino, methoxy, ethoxy and butoxy, phenoxy, methylphenoxy, chlorophenoxy and phenylthio groups. Chlorine atoms or cyano, nitro, carboxy or carbalkoxy groups in the 5-position of a pyrimidinyl radical come into the category of non-labile substitutents.

According to a further feature of the invention there is provided a process for manufacture of new azo dyestuffs which comprises interacting an azo compound of the formula:

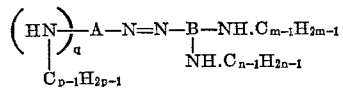 (5)

wherein A, B, m, n, p and q have the meanings stated above, with (q+2) molecular proportions of a reactant suitable for replacing a hydrogen atom of an organic amine by a group capable of reaction with the hydroxyl groups of cellulose with formation of a covalent bond between the dyestuff and the cellulose molecule, e.g. the acid halide or anhydride of an acid which contains such a group.

Throughout this specification the term "a reactant as herein defined" is used to refer to such a reactant.

In a modification of the above process, an azo compound of the formula:

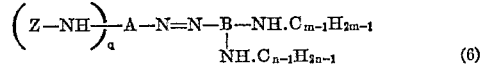 (6)

wherein A, B, Z, m, n and q have the meanings stated above, is reacted with 2 molecular proportions of a reactant as defined above.

In a second modification of the above process, an azo compound of the formula:

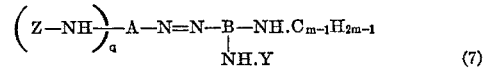 (7)

wherein A, B, Y, Z, m and q have the meanings stated above is reacted with 1 molecular proportion of a reactant as defined above.

The treatment of the azo compound with the reactant can conveniently be carried out by stirring an aqueous solution of the compound with an aqueous suspension or solution of the reactant; the temperature of the reaction can be varied from 0° to 100° C. and must be chosen with due regard to a side reaction in which water reacts with the reactant and hydrolyses the group capable of reacting with the fibre.

As examples of reactants which may be used, there may be mentioned, for example, the anhydrides or acid halides of α:β-unsaturated aliphatic acids such as chloromaleic anhydride propiolyl chloride and acrylyl chloride, the acid chlorides of halogenated aliphatic acids such as chloroacetyl chloride, sulphochloroacetyl chloride, β-bromo and β-chloropropionyl chloride and α,β-dichloropropionyl chloride, and preferably, heterocyclic compounds which contain at least 2 nitrogen atoms in the heterocyclic rings and which contain 2 or more halogen, especially chlorine, atoms in the ortho position to the nitrogen atoms, such as 2,3-dichloro-quinoxaline-5- and 6-carboxylic acid chloride, 2,3-dichloro-quinoxaline-5- and 6-sulphonyl chlorides, 2,4-dichloro-quinazoline-6- and 7-sulphonyl chlorides, 2,4,6-trichloro-quinazoline-7- and 8-sulphonyl chlorides, 2,4,7- and 2,4,8-trichloro-quinazoline-6-sulphonyl chlorides, 2,4-dichloro-quinazoline-6-carboxylic acid chloride, 1,4-dichloro-phthalazine-6-carboxylic acid chloride, 2,4,6-tribromo and tri-chloro-pyrimidines, 2,4,5,6-tetrachloropyrimidine, 5-methyl-2,4,6-trichloropyrimidine, 5-nitro-2,4,6-trichloropyrimidine, 2,4-dichloro-5-nitro-6-methylpyrimidine, 2,4 - dichloro - 5 - nitropyrimidine, 2,4,6 - trichloro - 5 - cyanopyrimidine, 5-carboethoxy-2,4-dichloropyrimidine, 5-carboxy-2,4-dichloro-pyrimidine, cyanuric bromide and, perferably cyanuric chloride and the primary condensation products of cyanuric bromide or cyanuric chloride with ammonia, an alkali metal sulphite or thiocyanate or an organic mercaptan, hydroxy compound or an organic primary or secondary amine, for example methanol, ethanol, iso-propanol, phenol, o-, m- and p-chlorophenols, o-, m- and p-cresols, o-, m- and p-sulphophenols, thiophenol, thioglycollic acid, dimethyldithiocarbamic acid, mercaptobenzthiazole, thioacetamide, methyl-, dimethyl-, ethyl-, diethyl-, n-propyl, iso-propyl-, butyl-, hexyl- or cyclohexyl-amine, toluidine, piperidine, morpholine, methoxyethyl-amine, ethanol-amine, aminoacetic acid, aniline-2:5-, 2:4 and 3:5-disulphonic acids, orthanilic, metanilic and sulphanilic acids, 2,3 and 4-aminobenzoic acids, 4- and 5-sulpho-2-aminobenzoic acids, 5-amino-2-hydroxybenzoic acid, 2-aminoethanesulphonic acid, aminonaphthalene mono- and di-sulphonic acids and N-methylaminoethane sulphonic acid; also, the secondary condensation products of cyanuric chloride with alkali metal sulphites, alkali metal thiocyanates, phenols and thiophenols containing an electronegative substituent, and compounds of the formulae

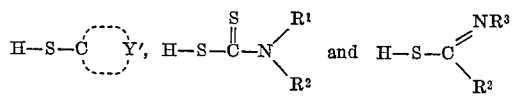

wherein Y', $R^1$, $R^2$, $R^3$ and $R^4$ have the meanings stated above.

Azo compounds of Formula 5 suitable for use for manufacture of the new dyestuffs can be obtained, for example, by diazotising a dinitro aniline, coupling the resultant diazonium compound with a coupling component containing at least one amino group, and reducing the nitro group to amino. It is preferred, however, to use azo compounds obtained by coupling aromatic diazonium compounds containing an acetylamino group with a coupling component having a benzene or naphthalene nucleus carrying two amino groups, more especially a coupling component of the formula:

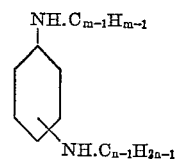

or

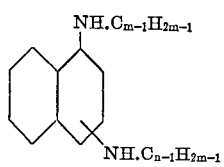

in which the benzene or naphthalene nucleus can carry additional substituents, and hydrolysing the resultant compound.

Other suitable azo compounds can be obtained by coupling tetrazotised aromatic diamines with two moles of such a coupling component.

As examples of coupling components of Formula 8 or Formula 9, there may be mentioned, 1,3-diaminobenzene, 3-methylaminoaniline, 2-methyl- and 2-methoxy-1:3-diaminobenzene and 1:3, 1:5- and 1:7-naphthylenediamines.

There can alternatively be used a monoacyl derivative of a coupling component of Formula 8 or 9, the resultant azo compound being hydrolysed to remove the acyl group.

As examples of aromatic amines or their monoacyl derivatives which can be used for preparation of azo compounds of Formula 5, there may be mentioned 4,4'-diaminostilbene-2,2'-disulphonic acid, 4,4'-diaminodiphenyl-2,2'-disulphonic acid, 4-acetylamino-4'-aminostilbene-2,2'-disulphonic acid, 6-N-acetylamino-2-aminonaphthalene-4:8-disulphonic acids and 4-N-acetylamino-1-aminonaphthalene-6- (and 7) sulphonic acids, also amino azo compounds obtainable by coupling the diazonium salts of such aromatic amines with coupling components containing a diazotisable amino group, for example 2-methoxy-5-methylaniline, 2:5-dimethoxyaniline, 2-methoxyaniline, 2-carboxyaniline, 2-methylaniline, 3-methylaniline, 3-ureidoaniline, 3-acetylaminoaniline and 1-naphthylamine-6- (and 7) sulphonic acids.

The azo compounds of Formula 6 can be obtained by condensing an aromatic polyamine of the formula $(NH_2)_q A-NH_2$ (10) with $q$ moles of a reactant as herein defined, diazotising the resulting aromatic monoamine, and coupling the resultant diazonium compound with a coupling component of Formula 8 or Formula 9.

The azo compounds of Formula 7 can be obtained by condensing an aromatic polyamine of Formula 10 with $q$ moles of a reactant as herein defined, diazotising the resultant aromatic monoamine, and coupling the resultant diazonium compound with a coupling component of the formula:

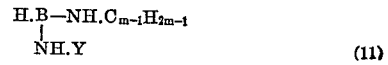

As examples of polyamines of Formula 10, there may be mentioned 2,6 - diaminonaphthalene-4,8-disulphonic acid, m-phenylene diamine and 1,3-phenylene diamine-4-sulphonic acid, also the aminoazo compounds obtainable by diazotising the monoacyl derivative of an aromatic diamine, of which a number of examples have been mentioned above, coupling the product with a coupling component containing a diazotisable amino group, of which a number of examples have been mentioned above, and hydrolysing the resultant product.

The coupling components of Formula 11 can be obtained by reacting a diamine of the formula

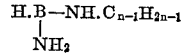

for example, m-phenylene diamine, 3-methylamino aniline, 2-methyl- and 2-methoxy-1,3-diaminobenzenes and 1,3-, 1,5- and 1,7-naphthylene diamines, with one mole of a reactant as herein defined.

In yet a further modification of the process of the invention, the dyestuffs of Formula 1 in which A, B, $m$, $n$, $p$ and $q$ have the meanings stated above the X, Y and Z stand for 2-chloro-s-triazin-6-yl groups in which the 4 position of the triazine nucleus carries an amino or substituted amino group, are obtained by reacting a dyestuff of Formula 1 in which A, B, $m$, $n$, $p$ and $q$ have the meanings stated above and X, Y and Z each stands for a 2,4-dichloro-s-triazin-6-yl group with $(q+2)$ moles of ammonia or an amine.

The new azo dyestuffs can be isolated by customary techniques for the isolation of water-soluble dyestuffs, for example by spray-drying or by precipitating the dyestuffs in the form of its sodium salt by adding sodium chloride to the reaction medium and filtering off and drying the resultant precipitate.

The new azo dyestuffs of the invention are valuable for colouring cellulose textile material such as cotton, linen and viscose rayon. For colouring the cellulose textile materials, the new azo dyestuffs can be applied by either a dyeing or a printing process, preferably in conjunction with a treatment with an acid-binding agent such as sodium carbonate or bicarbonate or a substance such as sodium trichloroacetate which on heating liberates an acid-binding agent, the said treatment being carried out before, during or after the application of the dyestuffs. When so applied to cellulose textile materials, the new azo dyes yield shades which possess excellent fastness to wet treatments such as washing and are distinguished by the efficiency with which the dyestuff reacts with the cellulose molecule.

The invention is illustrated but not limited by the following examples in which the parts are by weight:

Example 1

16 parts of the disodium salt of the triaminoazo compound obtained by coupling diazotised 6-acetylamino-2-aminonaphthalene-4:8-disulphonic acid with m-aminoacetanilide in acid medium and subsequently hydrolysing to split the acetylamino groups, are dissolved in 200 parts of water and the solution is added to a solution of 36 parts of the sodium salt of 2:4-dichloro - 6 - (3'-sulphophenylamino)-s-triazine in 200 parts of water and 135 parts of acetone. The mixture is heated at 45–50° C. for 5 hours, the pH being maintained at 7 by the addition of a 10% aqeous solution of sodium carbonate. The mixture is treated with 10% potassium chloride, filtered and the residue on the filter is then dried.

The dyestuff composition, so obtained, contains 3 atoms of hydrolysable chlorine per molecule. When applied to cellulose textile materials in conjunction with a treatment with an acid-binding agent, the dye has excellent fixation and yields reddish-yellow shades having very good fastness to washing to light. For example, when viscose rayon is treated at a liquor:goods ratio of 30:1 at 80° C. in the presence of 30–45 g./l. of salt for 30 minutes, thereafter 10 g./l. sodium carbonate is added and dyeing contained for 2 hours, about 95% of the dyestuff fixes.

Example 2

A solution of 18.78 parts of the disodium salt of the disazo compound obtained by coupling one molecular proportion of tetrazotised benzidine - 2:2′ - disulphonic acid with two molecular proportions of 1:3-phenylenediamine in acid medium, in 250 parts of water is added to a solution of 41.16 parts of the sodium salt of 2:4-dichloro-6-(3′-sulphophenylamino)-s-triazine in a mixture of 150 parts of water and 170 parts of acetone. The mixture is stirred for 3 hours at 45–50° C. the pH of the mixture being maintained at 7 by the addition of a 10% aqueous solution of sodium carbonate. 80 parts of sodium chloride are added and the compound which is precipitated is filtered off and is then dried.

The dyestuff composition so obtained contains 3.6 atoms of hydrolysable chlorine per molecule. When applied to cellulose textile materials in conjunction with a teratment with an acid-binding agent, the dye has excellent fixation and yields reddish-yellow shades having very good fastness to washing and to light.

Example 3

6-acetylamino-2-naphthylamine-4:8-disulphonic acid is coupled with one molecular proportion of m-phenylenediamine in acid medium and the acetylamino group is converted to amino by hydrolysis with hydrochloric acid. A solution of 12 parts of the disodium salt of the triamine monoazo compound so obtained in 200 parts of water is added gradually at 0–5° C. to a suspension of 14.0 parts of cyanuric chloride in 120 parts of acetone, 50 parts of water and 50 parts of ice. The mixture is stirred for 3 hours at 0°–5° C. and is then neutralised to pH 7.0 by the addition of 30 parts of a 10% aqueous solution of sodium carbonate. A solution of 16.8 parts of the sodium salt of 2-methyl-5-sulphoaniline in 100 parts of water is added to the above mixture and the latter is stirred at 45–50° C. for 3 hours the pH being maintained at 7 by the addition of a 10% aqueous solution of sodium carbonate.

The dyestuff composition so obtained contains 2.87 atoms of hydrolysable chlorine per molecule. When applied to cellulose textile materials in conjunction with an acid-binding agent the dye has excellent fixation and yields reddish-yellow shades having very good fastness to washing and to light.

Example 4

A solution of 3.9 parts of the sodium salt of metanilic acid in 50 parts of water is added dropwise below 5° C. to a suspension of 3.7 parts cyanuric chloride in 40 parts acetone and 40 parts of water. The mixture is stirred for 1 hour below 5° C. the pH of the solution being maintained at 7 by the gradual addition of 10% aqueous solution of sodium carbonate. A solution of 2.2 parts m-phenylenediamine in 150 parts of water is then added dropwise. The mixture is heated to 30° C. for ½ hour the pH of the solution being maintained at 7 by the addition of 10% aqueous solution of sodium carbonate.

A solution of 4.2 parts of the sodium salt of 1:3-phenylenediamine -4-sulphonic acid in 50 parts of water is added dropwise to a suspension of 3.7 parts cyanuric chloride in 40 parts of acetone and 40 parts of water. The mixture is stirred for 1 hour below 5° C. the pH of the solution being maintained at 7 by the gradual addition of 10% aqueous solution of sodium carbonate. To the mixture is then added 10 parts of a 2 N aqueous solution of sodium nitrite followed by 6 parts of concentrated hydrochloric acid. The mixture is stirred at 0°–5° C. for 30 minutes, then the excess of nitrous acid is removed by the addition of sulphamic acid. The mixture is added with rapid stirring, below 5° C., to the solution of 1 - (4′ - chloro-6′-metanilino-1′:3′:5′-triazin-2′-ylamino)-3-aminobenzene and then the pH is raised to 6 by the gradual addition of 10% aqueous solution of sodium carbonate. The mixture is stirred for 2 hours until coupling is complete.

A solution of 6.0 parts of the disodium salt of aniline-3:5-disulphonic acid in 60 parts of water is added below 5° C. to a suspension of 3.7 parts cyanuric chloride in 40 parts of acetone and 40 parts of water. The mixture is stirred for 1 hour below 5° C. the pH of the solution being maintained at 7 by the gradual addition of 10% aqueous solution of sodium carbonate. To this solution is added the monoazo suspension. The mixture is heated for 2 hours at 40° C. the pH of the solution being maintained at 7 by the gradual addition of 10% aqueous solution of sodium carbonate. The dyestuff is precipitated by addition of 90 parts of sodium chloride and isolated by filtration. The filtercake is washed with 50 parts of acetone and dried.

The dyestuff contains 3.6 atoms of hydrolysable chlorine per molecule. When applied to cellulose textile materials in conjunction with a treatment with an acid-binding agent, the dye yields orange shades having good fastness to washing and to light.

The following table gives the shades of further new dyestuffs of the invention obtained as described in Examples 1 and 2 by condensing the polyamino-azo compound named in the first column with the heterocyclic compound (B) named in the second column of the table, using one molecular proportion of the latter for each amino group present in the polyamino azo compound.

| Example | Polyaminoazo compound | Heterocyclic compound (B) | Shade |
| --- | --- | --- | --- |
| 5 | 4:4′-bis(2″:4″-diaminophenyl-1″-azo)-diphenyl-2:2′-disulphonic acid | 2:4-dichloro-6-(3′-sulphophenylamino)-s-triazine (4 mols) | Reddish-yellow. |
| 6 | 6-amino-2(2′:4′-diaminophenylazo)-naphthalene-4:8-disulphonic acid | 2:4-dichloro-6-(4′-sulphophenylamino)-s-triazine | Do. |
| 7 | do | 2:4-dichloro-6-(2′-methyl-5′-sulphophenylamino)-s-triazine | Do. |
| 8 | do | 2:4-dichloro-6-(2′-methyl-4′-sulphophenylamino)-s-triazine | Do. |
| 9 | do | 2:4-dichloro-6-(2′-carboxy-4′-sulphophenylamino)-s-triazine | Do. |
| 10 | do | 2:4-dichloro-6-(3′:5′-disulphophenylamino)-s-triazine | Do. |
| 11 | 2′:3:4′-triamino-6-sulpho-1:1′-azobenzene | 2:4-dichloro-6-(3′-sulphophenylamino)-s-triazine | Do. |
| 12 | do | 2:4-dichloro-6-(4′-sulphophenylamino)-s-triazine | Do. |
| 13 | do | 2:4-dichloro-6-(3′:5′-disulphophenylamino)-s-triazine | Do. |
| 14 | 2′:4:4′-triamino-6-sulpho-1:1′-azobenzene | 2:4-dichloro-6-(3′-sulphophenylamino)-s-triazine | Do. |
| 15 | do | 2:4-dichloro-6-(2′-methyl-5′-sulphophenylamino)-s-triazine | Do. |
| 16 | 6-amino-2-(2′:4′-diaminophenylazo)-naphthalene-4:8-disulphonic acid | 2:4-dibromo-6-(3′-sulphophenylamino)-s-triazine | Do. |
| 17 | 4-amino-4′-(2″:4″-diaminophenylazo)-stilbene-2:2′-disulphonic acid | 2:4-dichloro-6-(3′-sulphophenylamino)-s-triazine | Do. |

| Example | Polyaminoazo compound | Heterocyclic compound (B) | Shade |
|---|---|---|---|
| 18 | do | 2:4-dichloro-6-(3':5'-disulphophenyl-amino)-s-triazine. | Do. |
| 19 | do | 2:4-dichloro-6-(2'-methyl-5'-sulpho-phenylamino)-s-triazine. | Do. |
| 20 | 6-amino-2-(2':4'-diamino-3'-methylphenyl-azo)naphthalene-4:8-disulphonic acid. | 2:4-dichloro-6-(3'-sulphophenylamino)-s-triazine. | Do. |
| 21 | 6-amino-2-(2'-amino-4'-N-methylamino-phenylazo)naphthalene-4:8-disulphonic acid. | do | Do. |
| 22 | 1-amino-4-(2':4'-diaminophenylazo)naphthalene-7-sulphonic acid. | 2:4-dichloro-6-(3'-sulphophenylamino)-s-triazine. | Orange. |
| 23 | 2-[2':5'-dimethyl-4'(2'':4''-diaminophenyl-azo)phenylazo]-6-aminonaphthalene-4:8-disulphonic acid. | 2:4-dichloro-6-(3':5'-disulphophenyl-amino)-s-triazine. | Do. |
| 24 | 2-[4'-(2'',4''-diaminophenylazo)2'-amino-phenylazo]-6-aminonaphthalene-4,8-disulphonic acid. | 2,4-dichloro-6-(3'-sulphophenylamino)-s-triazine. | Brown. |
| 25 | do | 2,4-dichloro-6-(2'-methyl-5'-sulpho-phenylamino)-s-triazine. | Do. |

Example 26

6-amino-2-(5'-cyano-2':6'-dichloropyrimidin-4-ylamino)naphthalene-4:8-disulphonic acid is diazotised and coupled with an equimolecular proportion of m-phenylenediamine in acid medium. A solution of 6.5 parts of the disodium salt of the monoazo compound so obtained in 100 parts of water is added with stirring to a suspension of 6.4 parts of 2-(3'-sulphophenylamino)-4:6-dichloro-s-triazine in 40 parts of acetone and 80 parts of water. The mixture is heated at 40° C. for 3 hours the pH being maintained at 7 by the addition of a 10% aqueous solution of sodium carbonate. 20 parts of sodium chloride are added, the mixture is filtered and the residue on the filter is then dried.

The dyestuff composition so obtained contains 3.3 atoms of hydrolysable chlorine per molecule. When applied to cellulose textile materials in conjunction with a treatment with an acid-binding agent the dye yields reddish-yellow shades having good fastness to washing and to light.

The following table gives the shades of further examples of the new dyestuffs of the invention obtained by the general method of Example 26 by coupling the diazonium salt of the amino compound named in the second column of the table with the coupling component named in the third column and condensing the amino azo compound so obtained with an equivalent proportion of the acylating agent named in the fourth column of the table.

I claim:

1. The water-soluble reactive dyestuffs which are represented by the formula:

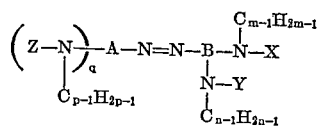

wherein A is an aromatic radical selected from the class consisting of disulphonaphthylene, sulphophenylene, sulphonaphthylene, disulphostilbene, phenyleneazo-disulphodiphenylene and phenyleneazo-disulphonaphthylene;

B is a radical selected from the class consisting of m-phenylene and m-tolylene;

X, Y and Z are independently selected from the class consisting of dichloro-s-triazine, monochloro-methoxy-s-triazine, monochlorosulphoanilino-s-triazine, monochloro-sulphotoluidino-s-triazine, monochloro-carboxysulphoanilino-s-triazine, monochloro-disulphoanilino-s-triazine, cyanodichloropyrimidinyl, and trichloropyrimidinyl;

m, n and p stand for integers of at most 6, q is 1–2; and which contain 2–8 sulphonic acid groups.

| Example | Diazonium salt of the amino compound | Coupling component | Acylating agent | Shade |
|---|---|---|---|---|
| 27 | 6-amino-2-(5'-cyano-2':6'-dichloro-pyrimidin-4'-ylamino) naphthalene-4:8-disulphonic acid. | 1:3-diaminobenzene | 2:4-dichloro-6-(3':5'-disulphophenyl-amino)-s-triazine. | Reddish-yellow. |
| 28 | do | 2-methyl-1:3-diamino-benzene. | 2:4-dichloro-6-(3':5'-disulphophenyl-amino)-s-triazine. | Do. |
| 29 | 6-amino-2-(β-chloropropionylamino)-napthalene-4:8-disulphonic acid. | 1:3-diaminobenezene | 2:4-dichloro-6-(3'-sulphophenylamino)-s-triazine. | Do. |
| 30 | 6-amino-2(2':5':6'-trichloro-pyrimidin-4'-ylamino)naphthalene-4:8-disulphonic acid. | do | 2:4-dichloro-6-(3'-sulphophenylamino)-s-triazine. | Do. |
| 31 | 6-amino-2(4'-chloro-6'-methoxy-triazin-2'-ylamino)naphthalene-4:8-disulphonic acid. | do | 2:4-dichloro-6-(3':5'-disulphophenyl-amino)-s-triazine. | Do. |

2. A water-soluble dyestuff represented by the formula:

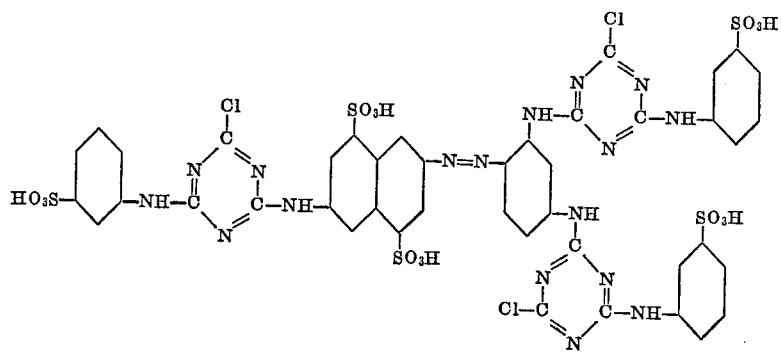

3. A water-soluble reactive dyestuff represented by the formula:
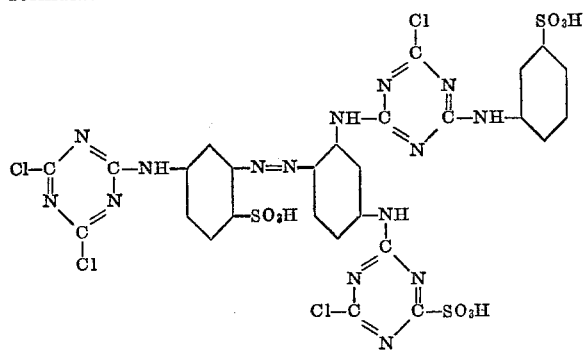
4. A water-soluble reactive dyestuff represented by the formula:
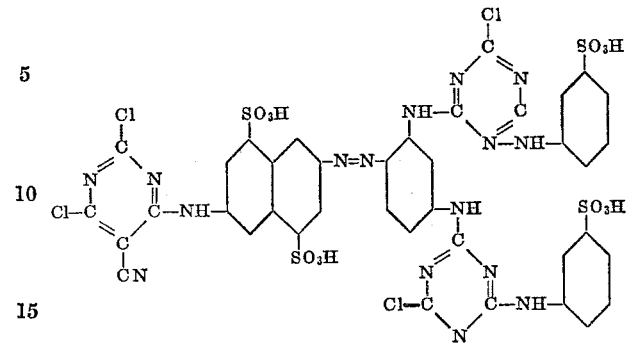
References Cited
UNITED STATES PATENTS
3,349,074  10/1967  Andrew _____ 260—146
CHARLES B. PARKER, *Primary Examiner.*
D. M. PAPUGA, *Assistant Examiner.*
U.S. Cl. X.R.
8—41, 54.2; 260—154, 157, 158, 191, 196, 199, 205, 207.1, 249.5, 249.8, 256.5